United States Patent Office 3,230,162
Patented Jan. 18, 1966

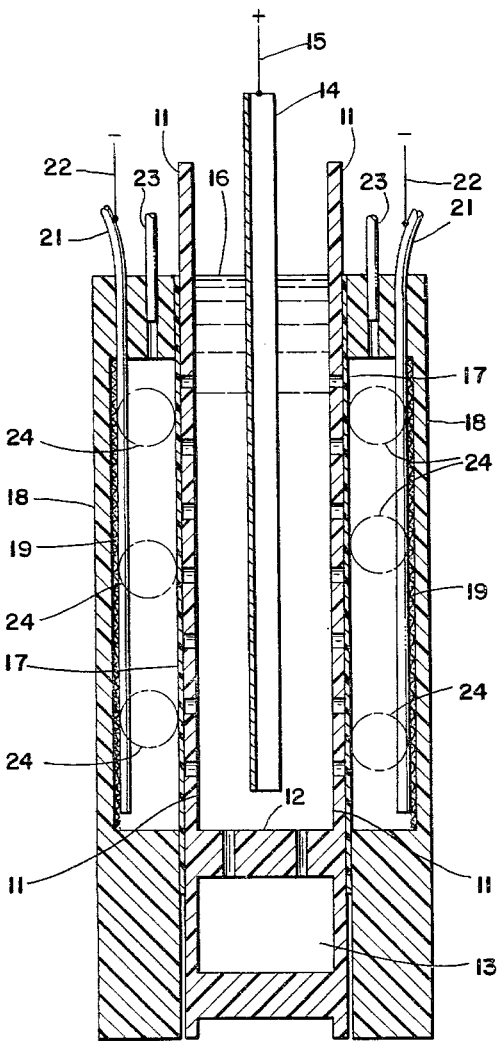

3,230,162
ELECTROPAINTING PROCESS AND PAINT BINDER CONCENTRATE COMPOSITION THEREFOR
Allan E. Gilchrist, Fairview Park, Ohio, assignor, by mesne assignments, to Ford Motor Company, Dearborn, Mich., a corporation of Delaware
Filed Aug. 14, 1963, Ser. No. 304,297
53 Claims. (Cl. 204—181)

This application is a continuation-in-part of my copending U.S. Patent Application Serial Number 249,812, filed January 7, 1963, now abandoned which in turn is a continuation-in-part of my copending U.S. Patent applications Serial Numbers: 132,303, filed August 18, 1961, now abandoned; 183,024, filed March 28, 1962, now abandoned; 186,320, filed April 10, 1962; 186,496, filed April 10, 1962, now abandoned; 202,691, filed June 15, 1962, now abandoned; and 218,575, filed August 22, 1962, now abandoned. The disclosures of these copending applications are incorporated herein by reference.

Advantages of my invention over prior practices include operating stability of the painting bath and paint binder compositions therein, even deposition of the paint film, simplicity of operating control, good paint coating into crevices and around corners, deposition in a self-limiting thickness, and resistance of the deposited film to condensed vapor washing prior to and during ultimate cure, as, for example, by baking.

Broadly, my process is an improvement for electrocoating an anode in an electrical circuit comprising a bath of aqueous medium in electric contact with an anode and a cathode. In one aspect the improvement comprises dispersing in said bath a film-forming paint binder containing a polycarboxylic acid resin at least partially neutralized with water soluble amino compound, said polycarboxylic acid resin having electrical equivalent weight between about 1,000 and about 20,000, acid number between about 30 and about 300, and, in said bath, exhibiting anionic polyelectrolyte behavior as indicated by its deposition on said anode substantially directly proportional with the electric current being passed through said bath; passing direct current through said circuit to a maximum potential of about 50 to about 500 volts, thereby causing a film containing said resin to electrodeposit on said anode; withdrawing the resulting coated anode from said bath; and thereafter curing said film.

A further aspect of this invention deals with maintaining such coating operations over an extended period wherein said polycarboxylic acid resin is depleted from the bath and an amino compound reserve accumulates in the bath. A supplemental quantity of said polycarboxylic acid resin is added to the bath gradually, this supplemental quantity being sufficient to maintain bath pH below about 8.4. The supplemental quantity added at any time is, of course, sufficiently small to preserve the anionic polyelectrolyte behavior of the polycarboxylic acid resin in the bath.

A further aspect of this invention is an improved film-forming organic resin paint binder concentrate composition adapted for dispersing in an aqueous electrocoating bath containing sufficient additional water soluble amino compound to impart anionic polyelectrolyte behavior in said bath to resin in said binder concentrate composition. The binder concentrate composition comprises about 50-95% by weight of polycarboxylic acid resin having electrical equivalent weight between about 1,000 and 20,000 and an acid number between about 30 and about 300; about 1-10% of water soluble amino compound based on the weight of said polycarboxylic acid resin in said composition; and the balance water. These percentages are given on a pigment and mineral filler-free basis.

A further aspect of this invention is the electrical deposition of an enduring (as opposed to fugitive after cure) paint film on an anode by dispersing with water soluble amino compound film-forming polycarboxylic acid anionic polyelectrolyte in an aqueous bath as the essential and fundamental part of the paint binder, which polyelectrolyte undergoes conversion of sufficient of its ionic sites into hydrogen form to render the polyelectrolyte substantially water insoluble from its amino-dispersed form in the bath upon reaching the electrically-charged anode and coalesces there to apply a paint deposit substantially uniform in thickness. Such polyelectrolyte can make up the entire resinous binder fraction of the paint, or it can be extended with minor proportions, on a total resin basis, of extender resins such as phenolic resins, hydrocarbon resins, and/or a latex not exhibiting such polyelectrolyte properties, provided, however, such proportion is restricted sufficiently so as not to mask the electrical migration characteristics of the polyelectrolyte resin binder, the fundamental and essential binder constituent for this operation. The electrical specific resistance of the polyelectrolyte resin when it is dispersed in the bath is low, and upon this conversion on the anode the resin forms a film of very high specific resistance.

The drawing is a cross-sectional elevation of apparatus useful for conducting my coating process and simultaneously electrodialyzing water soluble amino compound accumulations from an anode zone.. This apparatus and its operation is more fully described in an example following.

In this application painting by electrodeposition is meant to include the deposition of finely ground pigment and/or filler in the binder, the deposition of binder without pigment and/or filler or having very little of same, but which can be tinted if desired, and the deposition of other water reducible surface coating compositions containing the binder which might be considered to be broadly analogous to enamel, varnish, or lacquer bases, and the coating material for such deposition is termed a "paint." Thus, the binder, which is converted to a water-resistant film by the electrodeposition and ultimately converted to a durable film resistant to conventional service conditions by final curing, can be all or virtually all that is to be deposited to form the film, or it can be a vehicle for pigmentary and/or mineral filler material or even other resins on which it exerts the desired action for depositing the film. It can, in some instances, be reduced with compatible organic solvents such as nonionic liquids which are fugitive on curing of the resulting film. When pigments and/or fillers are used, it is advantageous that water soluble salts in them, such as potassium or sodium salts, are very low and preferably absent so that electrical resistance of the bath and film deposit is not subject to uncontrolled variation, and that the primary control of electrical conductance in the operation is by means of the binder resin and neutralizing amino compound dispersed in the bath.

In some cases as indicated expressly hereafter, my at least partially neutralized resin appears to go into clear solution in the aqueous bath; in other cases some of the resin appears to be dispersed in the bath in a haze of particles of extreme fineness, a maximum resin particle size present being estimated at not more than about 500 millimicrons. In these latter instances I have often been able to apparently dissolve these dispersed particles into a clear aqueous bath solution by adding additional water soluble amino compound to the bath.

At any rate, the at least partially neutralized dispersed polycarboxylic acid resins in my baths exhibit typical anionic solute behavior with respect to migration to the anode in the electrical field used because this migration for a particular resin binder in my operation varies substantially directly with the amperage through the bath. In other words, when allowance is made for the electric current used to drive to the cathode varying concentrations of amino material present in excess of the minimum needed to impart the polyelectrolyte behavior, the coulombs of electricity used per gram of a particular resin binder deposited is substantially independent of voltage.

For practical purposes the final electrodeposited film does not appear to exhibit porosity and the thickness builds up rapidly to between about 10 and about 100 microns (in the absence of loading the bath with a very high proportion of electrically-conductive pigments such as metal powders, graphite, or the like) to virtually if not completely shut off current at a particular selected maximum voltage. This is in contrast to aqueous latex and similar water-reducible dispersions heretofore electrically deposited. When such prior art dispersions are subjected to the same sort of electrical environment as mine, they deposit films which are of fairly high electrical conductance and continue to build up in thickness instead of being self-terminating for a particular voltage, particle migration to the anode will vary substantially with voltage, and the resulting films tend to coat the anode thickest at points where the voltage is highest, e.g., at edges and corners, and are not especially uniform in thickness like the films which can be laid down by my process.

Accordingly, whether these polycarboxylic acid resin binders when at least partially neutralized with water soluble amino compound are in true aqueous solution, or apparent solution, or in ultrafine aqueous dispersion in the bath, they can be typified as polyelectrolytes in aqueous dispersion. They show migration in the bath with respect to the electric current characteristic of current-carrying anions in an aqueous solution and other solution properties, and therefore I consider them as solutes with respect to their critical operative action, which solutes coprecipitate on the anode with suspended resin, pigment, and other bath-insoluble materials. The resin migrates to an anode with respect to current put through the bath much as do metal cations to a cathode in an electroplating bath and is deposited by Faradic current, which is the dominating electrical phenomenon in the operation.

The especially useful polycarboxylic acid resins for my binders have an electrical equivalent weight between about 1,000 and about 20,000 and preferably between about 1,000 and about 2,000 for ease of dispersion and efficiency of operation. These resins disperse effectively in the painting bath for my operation when partially to fully neutralized (with respect to acid number) with water soluble amino compound and convert from a fluent material to a highly adherent, comparatively immobile film when deposited on a vertical surface by my process. At electrical equivalent weights above about 20,000 the polycarboxylic acid resins are difficult to disperse in my process, and their "throwing power" (ability to coat surfaces in interstices, etc.) can be impaired as compared to those in the ranges called for.

The electrical equivalent weight of a given resin or resin mixture is herein defined as that amount of resin or resin mixture that will deposit per Faraday of electrical energy input under the conditions of operation set forth in detail in the succeeding paragraph. For this purpose the value of one Faraday in coulombs is herein taken to be 107.88 (atomic weight of silver)÷0.001118 (grams of silver deposited by one coulomb from silver nitrate solution) or 96,493. Thus, if 0.015 gram of coating, the binder polycarboxylic acid resin moiety of which is 90% by weight and the balance of which is amino compound used to disperse it in the bath is transferred and coated on the anode per coulomb input to the process, the electrical equivalent weight of the resin is about 1303 or $0.015 \times 0.9 \times 107.88 \div 0.001118$.

By way of further illustration I find electrical equivalent weight (in the nature of a gram equivalent weight in accordance with Faraday's laws) of a particular polycarboxylic acid resin or resin mixture simply and conveniently for typical process conditions standardized on as follows: a polycarboxylic acid resin concentrate is made up at 65.56° C. (150° F.) by thoroughly mixing 50 grams of polycarboxylic acid resin, 8 grams of distilled water and diisopropanol amine in an amount sufficient to yield resin dispersion pH of 7.8 or slightly lower after the concentrate has been reduced to 5% by weight resin concentration with additional distilled water. The concentrate is then diluted to one liter with additional distilled water to give 5% resin concentration in the resulting dispersion. (If a slight insufficiency of the amine has been used, and the dispersion pH is below 7.8, pH is brought up to 7.8 with additional diisopropanol amine.) The dispersion is poured into a metal tank, the broadest side walls of which are substantially parallel with and 2.54 cm. out from the surfaces of a thin metal panel anode. The tank is wired as a direct current cathode, and the direct current anode is a 20 gauge, 10.17 cm. (4 inches) wide, tared steel panel immersed in the bath 7.62 cm. (3.5 inches) deep. At 26.67° C. (80° F.) bath temperature direct current is impressed from anode to cathode at 100 volts for one minute from an external power source, the current measured by use of a coulometer, and the current turned off. The anode panel is removed immediately, rinsed with distilled water, baked for 20 minutes at 176.67° C. (350° F.) and weighed. All volatile material such as water and amine is presumed to be removed from the film for practical purposes by the baking operation. The difference between tared weight of the fresh panel and final weight of the baked panel divided by the coulombs of current used, times 107.88, divided by 0.001118 gives the electrical equivalent weight of the resin for purposes of this invention.

The polycarboxylic acid resin can be modified and extended in various ways without impairing its useful characteristics. Modification often can actually improve the paint such as by hardening the resulting baked film. Thus, I have used polycarboxylic acid resins wherein there was blended thermoplastic, non-heat reactive phenolic resins into the polycarboxylic acid resin batches, which extended resins then were dispersed in water with the polyfunctional amino compound. The heating together, preferably with agitation, of the polycarboxylic acid resin with such phenolic resin for at least about ½ hour, and preferably about one to two hours or more, at a temperature between about 200° and about 260° C. appears to give a chemical bonding between those two components and no free phenolic resin appears to remain in the resin mixture. Thus, when the resulting resin is used in my electrocoating process, the coating is essentially homogeneous, and in an electrocoating bath containing the resulting resin product there is no appreciable accumulation of free phenolic bodies dissociated from the resin in an appreciable operating time.

Other suitable extenders for the polycarboxylic acid resins include hydrocarbon resins such as cumarone-indene resins, which are generally inert and thermoplastic, and diolefinic petroleum resins such as those of essentially naphthenic structure which are heat-reactive, e.g., cyclopentadiene resins. Addition of resins such as this also can give increased chemical resistance to the resulting cured film. Many other resinous extenders and film plasticizers of conventional nature, e.g., amino aldehyde resins, butadiene-styrene latices, vinyl chloride and vinylidene chloride homopolymer and copolymer latices, polyethylene resins, fluorocarbon resins, bis phenol-glycidyl ether resins, dicyclo diepoxy carboxylate resins, etc., are permissible also, provided however, that their concentration is not so high as to mask the unique electrical migration characteristics of the polycarboxylic acid resin anionic polyelectrolyte behavior in the electrocoating bath and thus cause deposition of a film that is manifestly uneven and coated heavier at edges and corners of a simple rectangular sheet anode than on its immersed faces.

Broadly, the polycarboxylic acid resins useful in the practice of my invention are film-forming at the electrodeposition bath temperature and are curable to a tack-free film. They include: coupled siccative oils, e.g., coupled glyceride drying or semidrying oils such as sunflower, safflower, perilla, hempseed, walnut seed, dehydrated castor oil, rapeseed, tomato seed, menhaden, corn, tung, soya, oiticica, or the like, the olefinic double bonds in the oil being conjugated or nonconjugated or a mixture, the coupling agent being an acyclic olefinic acid or anhydride, preferably maleic anhydride, but also crotonic acid, citraconic acid, or anhydride, fumaric acid, or an acyclic olefinic aldehyde or ester of an acyclic olefinic ester such as acrolein, vinyl acetate, methyl maleate, etc., or even a polybasic acid such as phthalic or succinic, particularly coupled glyceride oils that are further reacted with about 2–25% of a polymerizable vinyl monomer; maleinized unsaturated fatty acids; maleinized rosin acids, alkyd resins, e.g., the esterification products of a polyol with a polybasic acid, particularly glyceride drying oil-extended alkyd resins; acidic hydrocarbon drying oil polymers such as those made from maleinized copolymers of butadiene and diisobutylene; diphenolic acid and like polymer resins; and acrylic and vinyl polymers and copolymers having carboxylic acid groups such as butyl acrylate-methyl methacrylate-methacrylic acid copolymers, vinyl acetate-acrylic acid copolymers, acrylic acid and lower alkyl ($C_{1-4}$) substituted acrylic acid-containing polymers, i.e., those having carboxyl groups contributed by alpha, beta unsaturated carboxylic acids or residues of these acids, etc.

The acid number of the polycarboxylic acid resin for the paint binder should be at least about 30 for effective dispersion as the polyelectrolyte, and it can be as high as about 300 for practice of my invention. Using alkyd resins I have found that the best electrodeposition is from those having acid number between about 60 and about 200. The acid number of resins without appreciable content of anhydride groups can be determined with KOH by the ASTM standard method 555–54. If appreciable anhydride groups are present, the acid number can be determined by refluxing a 1.5–2 gram sample of the portion of the resin for one hour with 50 ml. of 0.5 N aqueous KOH and 25 ml. of pyridine, then back titrating with 0.5 N HCl to a phenolphthalein end point.

My preferred polycarboxylic acid resin for incorporating into the paint binder concentrate composition is a coupled siccative glyceride oil reacted with about 2–25%, basis the weight of the coupled oil, of a polymerizable vinyl monomer such as vinyl toluene, styrene, alpha methyl styrene, acrylonitrile or the like. The reaction with the vinyl monomer appears to enhance the deposited film by making it convert especially rapidly from a fluent dispersed material into an immobile, adherent, nonwettable (with water) and water resistant film on the substrate anode when at least about 2% of the vinyl monomer is reacted into the coupled oil; the electrical resistance of the bath is desirably raised when this resin is used also. However, if more than about 25% of the vinyl monomer is so reacted into the coupled oil, the film tends to entrap oxygen bubbles and can occasionally give a bubbly appearance which is often undesirable. The preferred vinyl monomer for economy and efficiency in the practice of my invention is vinyl toluene, preferably limited to 15% maximum on the weight of the coupled oil. When this resin is extended with non-heat reactive phenolic resin by the high temperature process previously described, it is the most highly preferred one for metal priming because of its final hardness.

In general I have found that the more highly acidic polycarboxylic acid resins for my binder compositions, e.g., those having acid number substantially above about 100, will form good polyelectrolyte dispersions in my process at a fairly low bath pH. Thus, for example, I have operated at a bath pH as low as 5 with a polycarboxylic acid binder resin having acid number of 177. Using resins and blends thereof having substantially lower acid number, e.g., about 100 or below, generally requires a higher minimum pH, e.g., 7–7.3, to insure the consistent polyelectrolyte behavior in the bath when treated with the water soluble amino compound. Accordingly, the useful lower bath pH in my process will be a function of the kind and concentration of the particular paint binder to be dispersed; it will be broadly between about 5 and about 7.3, though it should be recognized that operation at a somewhat higher pH and pH range will give a greater margin of safety in maintaining consistent polyelectrolyte behavior. When adding supplemental resin having acid number below about 100, e.g., a coupled glyceride drying oil resin reacted with a polymerizable vinyl monomer and extended with, for example, phenolic resin, I have found it advantageous to control such supplemental addition to the bath to keep bath pH between about 7 and about 8.3.

The especially suitable water soluble amino compounds for the practice of my invention are soluble in water at 20° C. to the extent of at least about 1% basis weight of solution and include hydroxy amines, polyamines and monoamines such as: monoethanolamine, diethanolamine, triethanolamine, N-methyl ethanolamine, N-aminoethyl-ethanolamine, N-methyl diethanolamine, monoisopropanolamine, diisopropanolamine, triisopropanolamine, "polyglycol amines" such as $HO(C_2H_4O)_2C_3H_6NH_2$, hydroxylamine, butanolamine, hexanolamine, methyldiethanolamine, octanolamine, and alkylene oxide reaction products of mono- and polyamines such as the reaction product of ethylene diamine with ethylene oxide or propylene oxide, laurylamine with ethylene oxide, etc.; ethylene diamine, diethylene triamine, triethylene tetramine, hexamethylene tetramine, tetraethylene pentamine, propylene diamine, 1,3 diaminopropane, imino-bis-propyl amine, and the like; and mono- di- and tri-lower alkyl ($C_{1-8}$) amines such as mono-, di- and tri-ethyl amine.

I have found that the best films are deposited when about 30–60% total amino equivalents present in the bath, both combined and free, are contributed by water soluble polyamine, and thus I prefer to operate that way. Preferably, it is diethylene triamine for efficiency and economy. The polyamine can be added to the bath along with supplemental binder concentrate composition dosing or separately.

The hydroxy amines, particularly those that are aliphatic in nature at points of hydroxyl attachment, such as the alkanol amines, are also very useful for treating the polycarboxylic acid resin for dispersion and appear to have some desirable resin solubilizing effect in water over and above their neutralizing action. As a practical matter the water soluble amino compound present in the bath over and above that amount necessary to impart anionic polyelectrolyte behavior to the particular polycarboxylic acid resin in the binder can be considered excess and is desirable, providing that the bath pH does not get so high that the bath absorbs $CO_2$ from atmosphere, or the high amine concentration lowers the specific resistance of the bath to below about 500 ohm-centimeters. Broadly, the proportion of amine used can be between about 2 and about 7 times, and preferably between about 3.5 and about 5.5 times, the minimum amount necessary for imparting anionic polyelectrolyte behavior to the particular binder resin or resin mixture in the bath. Specific resistance of the bath as made up is advantageously between about 700 and about 1000 ohm-centimeters to deposit coatings about 25 microns thick as a priming coat. Higher bath resistance gives a thinner film and vice versa.

Ammonia alone can be used but is less advantageous in my process for partially neutralizing the acid resin or resin mixture because it is so highly volatile at operating temperatures, small additions of it can cause comparatively large changes in pH of the bath, and baths using it tend to pick up $CO_2$ from the air easily and thus are susceptible to uncontrolled change in electrical characteristics. Accordingly, I prefer to use ammonia only to assist in dispersing the resin in the bath along with other water soluble amino compounds, and not to use it to the exclusion of other water soluble amino compounds.

To supplement the carboxylic acid resin in the bath as operations continue I can add additional binder concentrate composition (optionally pigmented to act as replacement paint solids) gradually, that is continuously or incrementally. For ease of dispersion and handling I prefer to add such supplemental resin in the form of a concentrated aqueous dispersion containing, on a pigment and filler-free basis, about 50–95% by weight of polycarboxylic acid resin (straight or extended) having electrical equivalent weight between about 1,000 and about 20,000 and acid number between about 30 and about 300, about 1–10% of water soluble amino compound based on the weight of said polycarboxylic acid resin, and the balance water.

While one can use resin dispersion concentrations below about 50% in such binder concentrate, this involves the handling of extra water which is economically undesirable. At resin dispersion concentrations substantially above about 90% the dispersion becomes increasingly difficult to handle, even when warm, and above about 95% resin concentration the dispersion is especially refractory towards handling. The binder concentrate composition is compounded with a small amount of water soluble amino compound to assist in dispersing the resin into the bath. Advantageously, if desired, the supplemental resin can be compounded with sufficient water soluble amino compound to maintain pH of the bath substantially constant, plus pigment and filler to replace that withdrawn from the bath by operating depositions and handling losses, thereby keeping the painting bath volume and operation substantially constant. The amino compound in the binder concentrate composition also assists in hydrating any anhydride groups that are present in conjunction with the water in said concentrate composition.

It should be recognized that the shape of the anode and its material of construction can be quite diverse for my process, e.g., wire, plate, perforated tubular forms, skew planes, perforated boxes, continuous sheet, etc. The anode can be metal, damp saline-treated paper, or other substance which is electrically conducting under the conditions of operation. Ultimate curing of the films can be forced (thermoset) by heating in an oven such as a conventional one vented to air at room pressure; the films can be air dried in most cases in a longer time to a satisfactory hardness and lack of tack, but force curing is preferred for speed and best final film.

For a truly practical operation the current used is advantageously not over about 45 amperes per square meter of anode surface immersed in the painting bath, and it is preferably substantially lower. Increasing the voltage at constant current is preferred in my operation, the voltage across the bath being raised gradually from zero or slightly above to about 50–500 volts. The use of substantially higher voltages can cause electrical breakdown of the deposited films and can give excessive nascent oxygen liberation at the anode. Alternatively the voltage can be kept substantially constant in the operation and the current allowed to vary.

One feature of my preferred polycarboxylic acid resin as a binder component is to permit oxygen to escape from it without excessive permanent bubble formation or entrapment in the electrodeposited film. Actually, in the drying oil-containing resins, a little absorbed oxygen appears to assist in giving a good and quick cure to the deposited film when later baked, and conventional metallic driers can be omitted from the vehicle composition, if desired. Additionally, various conventional oxygen sequestering agents such as mercaptobenzothiazol can be added to the vehicle in the bath and further reduce any oxygen bubble problem in a deposited film.

The bath can be maintained in an electrically conducting tank; such tank is wired as a cathode; the anode object to be coated is dipped into it. Direct current is passed between anode and cathode from an external electrical power source. Alternatively, the tank can be non-conducting and one or more metal cathodes can be put in the bath to establish the electrical circuit through the bath. "Throw" of a coating can be measured in one method by riveting three thin steel sheets together at the top so that their bases diverge, then using this as an anode. A good "throw" involves coating more than about 70% of the center leaf faces. I have been able to achieve over 90% painting of the center leaf faces in many experiments using my process.

Contrary to what would be expected from theoretical considerations, I have found that when the polycarboxylic acid resin binder in the bath is substantially below about ½–1%, the film deposition is not as good as at higher concentrations. At even lower resin concentrations in the bath the evenness, smoothness, adhesion, and thickness of the film deteriorates extremely rapidly. When the resin dispersion concentration is substantially above about 35–40% by weight, the bath viscosity can become so high that there is paint "dragging" when the coated body is withdrawn from the bath, that is, paint adheres and flows off non-uniformly to give an uneven deposit. The upper practical limiting concentration, it should be understood, will be to some extent a function of the particular resin in the bath at operating temperature (e.g., about 15–50° C. generally) correlative to its ease of dispersion or dissolution in water, its electrical equivalent weight, and its specific rate of change of viscosity with dispersion concentration. The 35–40% represents a practical maximum.

Also, the bath viscosity is especially important in large scale operations where electrical energy converted to bath heat has a relatively small area per unit volume of bath container to dissipate from. Accordingly, as viscosity goes up, the efficiency of heat transfer with cooling devices internal or external to the bath and from the tank walls themselves decreases substantially. Handling of the fluid in the bath and its drainage from the coated articles as they are withdrawn also are distinctly inferior when the viscosity of the bath rises greatly above that of water, i.e., more than about 200 times that of water. Heat control in the bath is important within a temperature range of roughly 15° to 50° C. to prevent the generation of undesirable volatile materials and even the destabilizing or undue additional polymerization of the paint dispersions in some cases. With a bath viscosity not above about 30 times that of water the heat control can be very simple since the efficiency of heat transfer is quite high.

The proportion of amino compound, particularly hydroxy amines in the bath, can be used to manipulate bath viscosity, the higher proportions generally promoting apparent solubilization of the resin and some reduction in viscosity. Other ways that I can and have used for assisting apparent solubilization and viscosity adjustment is by using advantageously between about 0.1 and about 10%, basis weight of the polycarboxylic acid resin in the bath, of a nonionic organic liquid compatible with the resin in the dispersion as a solubilizing assistant or, more accurately, dispersion modifier. Typical ones are: petroleum naphthas, specifically aliphatic, naphthenic and aromatic hydrocarbons or mixtures of same having boiling point between about 30° C. and about 240° C. and preferably between about 150 and 200° C. so that they will volatilize from the film on baking or other curing such as air curing; pine oil, glycerine, water soluble alkoxy alkanols such as 2-butoxy-butanol-1 and others of this type, and mono alkyl ethers of glycols such as the monobutyl ether of diethylene glycol. These alkylene oxide derivatives additionally reduce surface tension of resins and appear to assist in lowering viscosity of baths having a high resin content. Their use in a concentration substantially above about 10% can add delicacy of curing and affect the electrical control of the bath. Usually 0.1–6% (basis resin) in the bath is adequate for all purposes, but this concentration should be limited so that no distinct phase of such solubilizing assistant is apparent in the bath, thereby risking non-homogeneous film deposits.

In addition to gradually adding polycarboxylic acid resin binder concentrate to the bath to prevent accumulation of amine from rising to a high level (above about 8.4 whereby film quality suffers and $CO_2$ can be absorbed from the air), I can add to the bath as an excess amine scavenger polybasic acids approaching a molecular weight of about 1,000 (or average molecular weight of 1,000 when a mixture of such acids is used). To obtain especially good compatibility with the polycarboxylic acid resin I prefer to use low molecular weight polycarboxylic acid scavengers having molecular weight between about 500 and about 800. Advantageously, these scavenging acids are polymers of polyenoic acid having 12–44 carbon atoms, most suitably the so-called "dimer" acids which are predominantly the dimer of $C_{18}$ monounsaturated fatty acids, etc., principally linoleic with some trimer present. These form soaps readily with polyamies at temperatures below about 75° C. and upon codeposition with the film and curing can provide a polyamide in the resulting film which can enhance the corrosion resistance of the film.

Generally such useful scavenger acids include the dimers of linoleic, linolenic, oleic, sorbic, palmitolic, humoceric, eicosinic, and their mixtures. Additionally, succinic pyrotartaric, malic, tartaric, glutaric, adipic, pimelic, suberic, azelaic, and sebacic acids can be used, and unsaturated ones such as fumaric, maleic, phthalic and sorbic, various others, e.g., citric, pyromellitic, uvitic, and polymers and copolymers containing acrylic and methacrylic acids which exhibit multiple carboxylic acid functionality. The acids above $C_{11}$, e.g., $C_{12-44}$, appear to give the best soaplike formation for codeposition with the dispersed polycarboxylic acid resins in the bath. Those having dissociation constants of their first hydrogen ion in aqueous solution below about $1.5 \times 10^{-5}$ appear to be of sufficiently low reactivity with polyamines in prolonged dispersion contact at temperatures under about 50° C. to prevent accelerated amidization and the formation of high molecular weight substances which are likely to precipitate in a short operating time and detract from the best operation of the bath. The polymers of the siccative polyenoic acids such as the so-called "dimer" acids are of this sort and are the most preferred.

In my coating process I also can use an electrodialyzing operation to remove excess amine from the bath dispersion around the anode. Cation exchange of the bath with ion exchange resin beds such as beds of the acid form of carboxylic acid ion exchange resins also can be used to remove excess amino compound from the anode zone.

In essence, the electrodialyzing operation involves isolating the anode from the cathode to form anode and cathode zones separated by a dialysis membrane having effective pore size between about 20 A. and about 200 A.; charging the anode zone with the dilute, aqueous painting dispersion and the cathode zone with water such as ordinary tap water. The membranes themselves are conventional and include regenerated cellulose (from viscose), vinyl chloride polymers, various permeable cellulosic materials and other synthetic resin sheets which are used ordinarily in dialyzing and which are water resistant at operating temperature, or even ceramic plates. Such sheets can be reinforced internally or externally for desired structural strength.

In such electrolysis operation only free amino compounds, low molecular weight resin breakdown products and amino electrolysis products, and stray inorganic cations will migrate through the membrane in any appreciable quantity while the paint deposits on the anode when the electrical circuit is made from anode to cathode through the compartmented bath. In any such operation it is especially advantageous to keep the titratable free amino compound in the anode zone at a level not substantially above about 2% by weight of the coating dispersion in that zone to obtain the best quality of deposited films.

The following examples show ways in which my invention can be practiced, but should not be construed as limiting the invention. All parts are parts by weight and all percentages are weight percentages, unless otherwise expressly indicated.

In the exemplary paint baths described hereafter, the resin in the bath dispersions shows anionic polyelectroylte behavior because deposition of the resin on the anode is essentially directly proportional with the direct current passing through the bath. The quotient of coulombs of electricity per gram of a particular resin binder deposited is virtually independent of voltage in the operating range (less than about 5–10% variation) when allowance is made for the additional current used to drive the varying concentrations of amino compound to the cathode, even when the maximum voltage is doubled or trebled in the operating range of 50–500 volts. It further appears that when the polyelectrolyte resin binder coats tenaciously on a pigment or other particle in the bath, such particle assumes the migration properties to the anode similar to the polycarboxylic acid resin itself.

In some cases, as indicated expressly in the examples, the resin is apparently in aqueous solution in the bath; and in the others some of the resin appears to be dispersed in the bath in extreme fineness, the maximum resin size present being estimated at not more than about 500 millimicrons. In these latter cases the dispersions can be cleared by adding additional amino compound to the bath to apparently dissolve the resin into clear aqueous solution. Aqueous dispersion of the polyboxylic acid resins in the operating bath increase in viscosity with increasing resin concentration much in the manner of solutions of the resins in other solvents as distinguished from aqueous latex dispersions.

The polycarboxylic acid resin in the bath appears to exhibit the electrical migration property of anionic solutes, the resin ion present capable of being thought of as $[R(COO)_n]$ having $n$ negative charges (where "R" represents the resin nucleus and "COO" represents a carboxyl radical). For illustration the amino ions resulting from neutralizing the resin in the bath (where the water soluble amine used is, for example, a primary monoamine) can be thought of as $[R'NH_3]^+$ where "R" represents the amino compound nucleus.

The exemplary paint films deposit on the anode itself quite uniformly and in a continuous film; deposition terminates at a particular maximum voltage across the bath when the film thickness, generally about 12.7–75 microns, deposits in about 1–3 minutes and effectively insulates the anode, thereby blocking further practical passage of current. This is in contrast to emulsion behavior such as the deposition of rubber latex in conventional electrophoresis operations.

The electrical equivalent weight of the exemplary polycarboxylic acid resins is between about 1,000 and about 2,000, and the acid numbers of these resins are between about 30 and 300.

*Example 1*

An extended coupled glyceride drying oil paint binder is made by reacting in an agitator tank 8,467 parts of alkali-refined linseed oil and 2025 parts of maleic anhydride (heated together at 232.2° C. for about three hours until an acid value of 80–90 results), then cooling this intermediate to 157.2° C., adding 1,789 parts of vinyl toluene containing 48 parts of ditertiary butyl peroxide and reacting at 218.3° C. for about an hour. The resulting vinyl toluenated material is then cooled to 157.2° C. and 5,294 parts of non-heat reactive, thermoplastic, oil-soluble phenolic resin is added, the temperature raised to 232.2° C. and the mixture hel done hour. The phenolic resin is a solid lump resin having softening point of 120–150° C., specific gravity of 1.03–1.05 at 20° C., and has been stripped to get out excess phenol and low molecular weight materials. It is a condensation product of about equimolar quantities of para tertiary butyl phenol and formaldehyde. The electrical equivalent weight of the resulting acid resin as extended is about 1,640, and it has acid number of 65.

The material then is cooled to 93.3° C., and 1,140 parts are taken for forming a paint dispersion. To these 1,140 parts, 100 parts of water are added, then 13.6 parts of triethylamine, the mixture agitated for a few minutes, then 74 more parts of water and 92.5 parts diisopropanol amine added. This mixture is further reduced with 1,825 parts water and 32.5 parts diethylene triamine while agitation is continued.

To this paint dispersion there is added 50 parts of a treating mixture of mineral spirits, a light hydrocarbon liquid having A.P.I. gravity of 45–49.5, specific gravity at 15.6° C. of 0.78–0.80, flash point (Cleveland Open Cup) between 37.8–46° C., a negative doctor test and no acidity, 12 parts of a wetting agent (the oleic ester of sarcosine, having a maximum of 2% free fatty acid, a specific gravity of 0.948, color on the Gardner scale of 6, and a molecular weight of 340–350). This material is compatible with the paint dispersion; no distinct hydrocarbon phase results either at this time, even though a substantial amount of hydrocarbon (predominantly aliphatic) has been used, nor after further addition of the pigment grind and addition of extra water to make the initial painting bath.

A pigment grind is made from 123 parts of vinyltoluenated, maleic-coupled linseed oil made in the same manner as the resin hereinabove shown in this example (except that the resulting polycarboxylic acid resin is not extended with the phenolic resin), 8.4 parts of diisopropanol amine, 0.7 part of an antifoam agent (a ditertiary acetylenic glycol with methyl and isopropyl substitution on the tertiary carbon atoms), 233 parts of fine kaolin clay, 155 parts of pigmentary titanium dioxide, 7.8 parts of fine lead chromate, 15.5 parts of fine red iron oxide, 16.9 parts of carbon black, and 201 parts of water. The resulting pigment grind is then blended with the foregoing paint dispersion and treating mixture to make a concentrated paint. The resulting paint is reduced further with water in the ratio of one part of the resulting paint per 5 parts of water to make an initial painting bath for electropainting operations. The resulting bath has resin solids (non-volatile matter) concentration of 7.24%. The total of amine equivalents used in making up the initial bath is about 4.5 times the minimum amount necessary to keep this polycarboxylic acid resin, once dispersed, in anionic polyelectrolyte condition in the bath and about 1.25 times full neutralization of the acid resin with respect to its acid number (determined by the pyridine method described hereinbefore). The number of coulombs of direct current used to electroplate a gram of this resin on an anode at minimum amine concentration in the bath to develop requisite polyelectrolyte characteristics for my coating process is virtually constant at 24. Specific resistance of the initial bath is about 900 ohm-centimeters.

The replacement paint solids are made by dispersing 1,140 parts of the same kind of extended polycarboxylic acid resin with 100 parts of water and 13.6 parts of triethylamine. To this is added the mineral spirits, the wetting agent, and the foregoing pigment grind, all of the same compositions and in proportions as are used to make up the original paint dispersion for the bath.

The painting operation is conducted in a metal tank equipped with an agitator. The tank is wired as a cathode, and a series of phosphate-treated thin sheet steel panels 22.85 cm. wide by 26.64 cm. dipped length are used as anodes for coating. The bath volume is 2,500 cc. Direct current is imposed on the tank cathode and an immersed panel anode from an external circuit. Electric current initially used is about 21.52 amperes per square meter of immersed panel surface, and it rises to about 37.66 as pH of the bath rises, i.e., additional current appears to be used to drive amine accumulation in the bath. The paint bath temperature during the operation is between 35° and 37.8° C., and the coating time of a particular panel is 53 seconds as it is being immersed, 74 seconds as it is fully immersed, and 53 seconds as it is being withdrawn. The voltage across the bath for a particular panel is run up from zero to a maximum of 200 volts during a particular panel-coating operation to deposit a film approximately 25.4 microns thick before electrical resistance of the film virtually stops deposition at the maximum voltage used. Before baking, the electrodeposited paint film is water resistant, slightly tacky, and tenaciously adhering. After baking for 15–20 minutes at 176.7° C. the film cures to exhibit an excellent, pore-free durable coating.

The initial pH of the bath is 8.1, and after 4 panels have thus been coated it rises to 8.25. At this point 25 parts of water and 30 parts of the replacement paint solids in warmed condition (65.6° C.) are readily dispersed in the bath with agitation. The pH of the bath declines to about 7.9 and resin solids concentration of the bath rises to approximately the original 7.24%. The electropainting operations are then commenced as before with continued like performance for 4 panels. At this stage the pH is 8.1; a further similar addition of replacement paint solids and water is made, and the bath pH goes to 7.7. Four more panels are painted with continued like performance and the bath pH rises to 8. Twenty-seven parts of an aqueous amine solution are added, the amine solution being made up in the proportion of 86 parts of water, 25 parts of diethylene triamine, and 86 parts of diisopropanol amine, and the bath pH rises to 8.25. Thirty parts of the replacement paint solids are added and bath pH declines to 7.95. Painting operations then are resumed as before with continued like good performance.

*Example 2*

An alkyd resin is made by heating 948 parts of tall oil fatty acids containing 97.6% tall oil fatty acids, 1.2% rosin acids and 1.2% unsaponifiable content, having Acid No. of 197, Sap. No. of 198, and an Iodine Value of 128, and 155 parts of maleic anhydride at 232.2° C. for one hour, cooling the mixture to 104.4° C., adding 503 parts of technical grade pentaerythritol, 394 parts of phthalic anhydride, and 30 parts of xylol (for water entraining solvent), then refluxing the batch at 171.1° C. with water of reaction separation until an acid number of 102.6 is reached on the resulting resin.

One hundred twenty-five parts of this resin, 10 parts of water, and 1.3 parts of triethylamine are made into a concentrated aqueous dispersion of 91.7% resin solids by mixing for 30 minutes. The concentrated dispersion (about 92% resin solids) is thereafter mixed with 31.8 parts of diisopropanol amine, 5.5 parts of diethylene triamine and sufficient water to reduce the resin solids (non-volatile matter) concentration to 5%. A clear aqueous varnish, apparently a solution, having pH of 7.15 results. It is used for an electropainting operation.

The painting operation is conducted in a similar manner to that described in Example 1, but in smaller equipment accommodating thin sheet steel anode panels 10.16 cm. wide by 8.89 cm. dipped length. The bath temperature is 26.7° C., the peak voltage 100, and the amperage used per sq. meter is 26.9. Electrical input is 108 coulombs per gram of coating applied. Before baking the electrodeposited paint film on a panel is slightly tacky, water resistant, and tenaciously adhering. After baking for 15–20 minutes at 176.7° C. the film cures (without drier addition) to give an excellent, pore-free durable coating.

The painting operation with this bath can be continued like that shown in Example 1 with the incremental addition of the concentrated alkyd resin dispersion of this example to the bath as the bath pH tends to rise toward about 8.1. Alternatively, the bath pH can be maintained substantially constant by the continuous addition of the concentrated resin dispersion and necessary water to maintain bath volume, plus addition of water soluble amino compound to the bath with the concentrated resin dispersion or periodically by itself. In such operation minimum bath pH desirably is kept from going substantially below about 6.5–7 to insure consistent anionic polyelectrolyte behavior of the resin in the bath throughout the coating operation.

Example 3

An acrylic resin is made by slowly adding a mixture of 60 parts of butyl acrylate, 25 parts of styrene, 15 parts of methacrylic acid, 1 part of t-butyl perbenzoate, and 1 part of benzoyl peroxide into 34.7 parts of 2-butoxyethanol maintained at 157.2–160° C. during a 2½ hour period and is held for an additional hour at this temperature using an agitated reactor equipped with a reflux condenser. The resulting resin is cooled to 137.8° C. and further reacted for ½ hour at 154.4° C. with 10 parts of tris hydroxyl methyl amino methane to enhance its apparent water solubility. The resulting resin dispersion has acid number of 57.6 and 75.6% resin solids content and is apparently soluble in the painting bath hereinafter described.

A white paint concentrate is made up by blending 133 parts of the foregoing resin dispersion, 10 parts of a water soluble amino compound mixture (composed of 86 parts diisopropanol amine, 25 parts diethylene triamine, and 86 parts water), 30 parts of a pigment grind (composed of 16 parts of titanium dioxide, 8 parts of fine kaolin clay, and 6 parts of the alkyd resin shown in Example 2), and 47 parts of water.

The bath for electrocoating is prepared by stirring the white paint concentrate with 10 additional parts of the amino compound mixture (86 parts diisopropyl amine, 25 parts diethylene triamine and 86 parts water) and 780 additional parts of water make up an agitated liter bath having 12.8% resin solids and pH of about 7.5.

The anodes used are 10.16 cm. wide x 8.89 cm. dipped length thin sheet steel panels and the painting operation is conducted similar to that of Example 1. Bath temperature used is 26.7–35° C., the voltage run up to 250 and the amperage per square meter is about 43.04 on a panel. Some of the panels are air dried at room temperature and produce a good, tack-free film in about 2 hours. Oven drying of the other coated panels for 5–15 minutes at 176.7° C. gives good glossy films.

As pH of the bath rises towards 8–8.3, the painting operation can be continued like that shown in Example 1 with incremental addition of the acrylic paint concentrate to reduce bath pH and maintain it between about 7 and 8.4, while also maintaining a desirable resin solids and a pigment concentration in the bath.

Example 4

An extended coupled glyceride drying oil resin is made like that of Example 1 except as otherwise especially indicated in this example.

Thin steel anode panels are electrodipcoated in an aqueous electrocoating bath using dispersed partially-neutralized aliquots of the resin at 5% resin concentration in the bath, the neutralization being to pH of about 8 with the particular water soluble amino compound indicated.

The dipping tank is of metal and is wired as a cathode. The anode is the panel to be coated. The runs are made with room temperature of about 25° C. Direct current is impressed between the electrodes using constant current of about 21.5 amperes per square meter of immersed anode surface, and the voltage is raised to a maximum of about 50–400 volts in the deposition process by decreasing electrical resistance in the portion of the electrical circuit external to the bath. The voltage rises gradually without significant inflection points that would indicate breakdown or imperfections in the film being applied to the anode.

After each anode is coated, in about 1–3 minutes' time, it is withdrawn from the bath, the excess adhering liquid blown off with air, then the anode is baked for 10–15 minutes at about 193° C. in an atmospheric oven. Before baking the electrodeposited film is slightly tacky and tenaciously adhering. It can be washed with water at this point if desired without harm; this can even improve the smooth appearance after the cure. After baking the resulting cured film is tough, flexible, and usually glossy, about 25 microns thick, and free of tack, tightly adhering to the metal panel even under flexure, cutting, or scratching. The film is even and smooth.

| Neutralizing Amine: | Remarks |
|---|---|
| Diisopropanol amine | Good film. |
| Diethanol amine | Good film. |
| Ethylene diamine | Film gives best resistance to salt spray test in this series. |
| Triethyl amine | Film very glossy. |
| Ammonia | Bath electrical resistance hardest to control. Bath shows tendency to absorb $CO_2$ from atmosphere as pH rises. |
| [1] Diisopropanol amine | Acceptable film, not as good as the first four. |

[1] The polycarboxylic acid resin in this case is made like that of Example 1 except that no vinyl toluene is used, and the polycarboxylic acid resin is not extended with phenolic resin.

Example 5

A batch (I) of phenolic-resin extended coupled glyceride drying oil resin is made like that of Example 1 except that the phenolic resin is blended in with the vinyl-toluenated coupled oil at 176.7° C. for 1 hour instead of 232.2° C. Another batch (II) is made like that shown in Example 1. Each resin is made into a paint and a painting bath in a manner similar to the initial painting bath of Example 1, and each of the resulting baths is operated for an extended period.

At the end of its run each used bath is dialyzed in the same manner through an external dialyzer using a regenerated cellulose membrane having 48 A. pore size. The used bath is passed into the dialyzer on one side of the membrane and fresh water on the other at double the flow rate of the used bath. Analysis of the dialyzed material from the used bath with the resin Batch II shows no phenolic substance, thereby showing good operating stability of the resulting resin (and which can be considered chemically bonded for my purposes), whereas the dialyzed material from the used bath with resin Batch I indicates that roughly 10% of the phenolic resin does not plate out on anodes with the polycarboxylic acid resin, but rather dissociates and possibly fragments in the bath in some fashion and thereafter migrates through the dialysis membrane as low molecular weight phenolic material.

Example 6

An extended coupled glyceride drying oil resin is made like that of Example 1. It is made up into a number of amino-neutralized and pigmented electrocoating baths similar to the initial painting bath of Example 1, except that the amount of water in each resulting bath is controlled to give varying resin solids content in the baths, and the bath viscosities vary as is indicated in the following table giving electrocoating performance results. Maximum voltage used is 150, current density about 21.51 amperes per square meter, and the electrocoating operation done at room temperature (about 25° C.) on thin steel anodes in the manner of Example 4. Viscosity is measured by a Brookfield viscosimeter using a No. 1 spindle. The coated anode panels are bake for 10–15 minutes at 193° C.

| Resin Solids in Bath Percent | Viscosity Centipoises | Approx. Coulombs Per Gram of Paint Deposited on Anode | Remarks |
| --- | --- | --- | --- |
| 33 | 116 | 51 | Glossy, uniform, excellent finish. |
| 30 | 54 | 52.7 | Do. |
| 20 | 20.8 | 52.3 | Do. |
| 10 | 13.6 | 52.9 | Do. |
| 5 | (¹) | 57.2 | Do. |
| 2.5 | (¹) | 62.2 | Slight "orange peeling" (unevenness beginning to appear). |
| 1.5 | (¹) | 95 | Still glossy, streamline deposits showing. |
| 1 | (¹) | 115.38 | Film not glossy and tending to flake off a little on baking. |

¹ Slightly greater than water.

Reducing the resin concentration still further makes completely unsatisfactory streaky, spotty, thin finishes as the bath resin concentration goes below ½%; when the resin solids are substantially above about 35%, the bath viscosity rises at an extremely rapid rate. Above about 35–40% bath resin concentration, the high viscosity of the bath causes undesirable "dragging" (uneven thickness) of the paint as the anode is removed from the bath.

*Example 7*

In this operation the painting bath used is like that initially made up in Example 1, except that the resin concentration in the bath is 5% and the mineral spirits concentration is varied. The electrocoating and baking operation is done like that of Example 6.

Mineral spirits solvent
level, percent basis dispersed     Baked film thickness,
resin:                              microns
0 _____ 22.9
0.6 _____ 25.4
1.8 _____ 28
3.0 _____ 30.5

All coatings are excellent. The electrical efficiency generally improves with increase in the naphtha, but at no time is a distinct naphtha phase observable. A general increase in film thickness is noted with the additional nonionic liquid solubilizing assistant (i.e., dispersion modifier).

*Example 8*

A paint is made up like that for the initial painting bath of Example 1, except that there is added 50 parts of a "dimer" acid (the polymerization product of $C_{18}$ unsaturated aliphatic monobasic acids, principally linoleic) having about 83% of a $C_{36}$ dibasic acid of about 565 molecular weight and about 1% maximum of $C_{18}$ fatty acids having molecular weight about 282 the dimer acid having an acid number of 188–196, saponification value of 192–198, a color on the Gardner scale of 8, and a neutralization equivalent of 287–289. The resulting paint is reduced to 5% resin solids concentration with water and applied to anodes as in Example 4 on various metal panels at maximum voltages from 150–350, then the panels are baked for 15–20 minutes at 176.7° C. to final cure. These paint baths operate about twice as long as similar ones having no amine-scavenging acid before amine concentration builds up to a level deleterious to the quality of the deposited films. The cured films about 25.4 microns thick on panels show excellent corrosion resistance at exposures as long as 250 hours to 3% sodium chloride solutions sprayed in a cabinet maintained at 32.2° C., the films being scored with scratch marks to the base metal. This paint itself appears to resist polymerization and side reactions under agitation at 35–36.7° C. for periods as long as 15 days. Polymerization and side reactions tend to raise electrical resistance of the dispersed resin and lower permissible deposited film thickness at a particular maximum voltage in the range from 50–500 volts.

*Example 9*

Referring to the drawing, the anode zone has acrylic plastic walls, 11, leading down to bottom, 12, which bottom is perforated to connect with and distribute upwards paint flowing in and from distributor box, 13. Walls, 11, are perforated as shown with a large number of large and small holes to give liquid access to dialysis membranes, 17.

The interior width between walls, 11, is 1.901 centimeters; this anode zone is 22.85 centimeters broad and the paint depth therein 24.13 centimeters, as represented by paint level, 16. The dialysis membranes, 17, were a pair of regenerated viscose cellulose sheets, 0.01092 centimeters thick. Anode 14 is a 21.58 cm. x 30.5 cm. rectangular piece of phosphatized steel shim stock immersed to expose 929 square centimeters of surface to the anode zone paint bath. On each vertical edge 0.635 centimeter of the shim stock is bent toward a right angle to give it structural stability as an anode.

The cathode zones are built alike of acrylic plastic members, 18, each forming a chamber whose interior dimensions are 21.58 centimeters broad, 20.33 centimeters high, and 0.9543 centimeter wide; members, 18, seal dialysis membranes, 17, to the imperforate portions of anode zone walls, 11. The seal between the two cathode chambers and the anode zone walls, in effect is gasketed with membrane, 17; these joints additionally are sealed against water leakage with a heavy grease and the assembly is held tightly together with metal through bolts, not shown.

In each cathode zone there is a bronze screen cathode, 19, covering the wall of the cathode chamber away from membranes, 17. Fresh tap water is introduced into each cathode chamber by copper tubings, 21, which discharge near the bottom of each cathode zone and also serve as electrical leads conducting to the bronze screen cathodes. Cathode effluent water containing dialyzed amino compound is withdrawn from each cathode zone by copper tubings, 23. Control of the water flow into and out of the cathode zones is maintained by means not shown. Items 24 of the drawing represent randomly positioned rubber tubing placed between the screen and the membrane to press the membrane against perforated panel, 11.

Paint is pumped continuously by an external pump, not shown, into paint distributor box, 13, and flows upwards through the anode zone, decanting at level 16 over a weir, not shown, and flowing to the pump suction for recirculation back to box, 13. The cathode zones run virtually full at all times.

A power source, not shown, supplies direct current from anode 14 to cathodes, 19, and is regulated by an external resistance, not shown, to maintain essentially constant current as a particular anode is being coated. The current is conducted to the cell by anode connector, 15, connected to shim stock anode, 14, and withdrawn from the cell by cathode connectors, 22, attached to water inlet tubes, 21. Except as otherwise mentioned herein, the body of the apparatus is made of clear, hard acrylic plastic.

During the coating of a particular anode the voltage rises to 150 volts across the combined electrocoating-electrodialysis cell. Initial operations are at room temperature with amperage for a particular anode being 15.84–21.52 amperes per square meter at the start of the coating runs and approaching 37.36 amperes per square meter as the temperature rises, the conductance of the cell rising as the temperature approaches 43.3° C. from room temperature in the series of runs.

A particular unpainted anode, 14, is dipped in the anode zone, the voltage run up to 150, this anode removed from the anode zone, the excess adhering liquid blown off the coated anode with air, and the coated anode baked for 10–15 minutes at 193.3° C. Before baking the electrophoretically-deposited paint film is slightly tacky and tenaciously adhering. After baking the film is cured to a tough, flexible, glossy film about 25.4 microns thick, free of tack and tightly adhering to the metal even under flexure. The film on each anode so coated and cured is smooth, even, and ostensibly flawless.

When one anode is coated and withdrawn from the bath, another unpainted one is inserted and coated the same way. After each five anodes are so coated, the bath is sampled to check for free amino substance (e.g., diisopropanol amine) and virtually no increase is found at any sampling, the increment all being dialyzed through membranes, 17, into the cathode zones and washed out with the cathode effluents being withdrawn through tubes, 23. After about every five panels additional dilute paint (5% resin solids) is added to make up the resin solids content in the anode bath dispersion to about 5%, there being about 1% drop in such solids for each five panels coated. Ninety-seven successive panels are coated in the run series.

The paint used is made like that used for the initial painting bath of Example 1 except that in the bath the dispersion concentration used is 5% instead of 7.24% resin solids.

I claim:

1. In a process for electrocoating an anode with paint in an electrical circuit comprising a bath of aqueous medium in electrical contact with an anode and a cathode, the improvement which comprises: dispersing in said bath a paint containing as the predominant fraction of the film-forming paint binder a synthetic polycarboxylic acid resin at least partially neutralized with a sufficient quantity of water soluble amino compound to maintain said polycarboxylic acid resin as a dispersion of anionic polyelectrolyte in said bath, said acid resin having electrical equivalent weight between about 1,000 and about 20,000, acid number between about 30 and about 300, and, in said bath, exhibiting anionic polyelectrolyte behavior as indicated by its depositing on said anode substantially directly proportional to direct electric current passed through said bath; pasing direct current through said circuit at a potential of about 50–500 volts, thereby causing a paint film to electrodeposit on said anode; and withdrawing the resulting coated anode from said bath.

2. The process of claim 1 wherein, as coating operations continue, said polycarboxylic acid resin is depleted from the bath, an amino compound reserve accumulates in the bath, and a supplemental quantity of said resin is added to the bath gradually, said supplemental quantity being sufficient to maintain bath pH below about 8.4.

3. The process of claim 2 wherein the supplemental resin is in the form of a concentrated aqueous dispersion containing, on a pigment and mineral filler-free basis, water, about 50–95% by weight of binder resin, at least the predominant fraction of which is said synthetic polycarboxylic resin, about 1–10% of water soluble amino compound based on the weight of said synthetic polycarboxylic acid resin, the sum of the proportions of said binder resin and said amino compound being less than 100%, and the bath pH is maintained between about 5 and about 8.3.

4. The process of claim 3 wherein the acid number of the resin is below about 100, and the bath pH is maintained between about 7 and 8.3.

5. The process of claim 1 wherein said acid resin comprises a siccative oil-modified polycarboxylic acid resin.

6. The process of claim 5, wherein said polycarboxylic acid resin comprises a coupled glyceride drying oil reacted under substantially anhydrous conditions with about 2–25% of a polymerizable vinyl monomer.

7. The process of claim 5 wherein said polycarboxylic acid resin is extended by blending it with a non-heat reactive phenol-aldehyde resin at a temperature between about 200° and about 260° C. for at least about 30 minutes.

8. The process of claim 1 wherein said polycarboxylic acid resin comprises an alkyd resin having acid number of 60–200.

9. The process of claim 1 wherein said polycarboxylic acid resin has carboxyl groups contributed by an alpha, beta unsaturated carboxylic acid.

10. The process of claim 1 wherein the concentration of said polycarboxlyic acid resin is established and maintained in said bath between about 1% and about 35% by weight of said bath, simultaneously and correlatively the bath viscosity is limited to a value not substantially more than about 200 times that of water at the same temperature, and the bath temperature is maintained between about 15° C. and about 50° C.

11. The process of claim 1 wherein the bath contains about 0.1–10%, basis weight of said polycarboxylic acid resin in the bath, of a nonionic organic liquid solubilizing assistant for said resin, the proportion of said nonionic liquid being insufficient to form a distinct phase in said bath.

12. The process of claim 1 wherein there is an excess of amino groups in solution in the bath over those required to maintain said polycarboxylic acid resin as a dispersion of anionic polyelectrolyte in said bath, and said polycarboxylic acid resin has an electrical equivalent weight between about 1,000 and about 2,000.

13. The process of claim 12 wherein there is added to the bath sufficient polybasic carboxylic acid of molecular weight below about 1,000 for neutralizing at least a portion of said excess of amino groups.

14. The process of claim 13 wherein said polybasic carboxylic acid of molecular weight below about 1,000 is a polymer of a polyenoic acid having 12–44 carbon atoms.

15. An improved film-forming organic resin paint aqueous binder replenishment concentrate composition adapted for dispersing in an aqueous electrocoating bath containing sufficient additional water soluble amino compound to impart anionic polyelectrolyte behavior in said bath to resin in said binder concentrate composition, said binder concentrate composition comprising, on a pigment and mineral filler-free basis: water, about 50–95% by weight of binder resin, at least the predominant fraction of which is a synthetic polycarboxylic acid resin having electrical equivalent weight between about 1,000 and about 20,000, acid number between about 30 and about 300, and being ionizable in dispersed phase in said bath to anionic polyelectrolyte; about 1–10% water soluble amino compound based on the weight of said polycarboxylic acid resin, the proportion of said amino compound being not substantially more than that sufficient for maintaining pH of said bath substantially constant, the sum of the proportions of said binder resin and said amino compound being less than 100%.

16. The composition of claim 15 wherein the electrical equivalent weight of said polycarboxylic acid resin is between about 1,000 and about 2,000.

17. The composition of claim 15 wherein said polycarboxylic acid resin comprises coupled siccative glyceride oil.

18. The composition of claim 17 wherein said polycarboxylic acid resin comprises a coupled siccative glyceride oil reacted under substantially anhydrous conditions with about 2–25% of a polymerizable vinyl monomer.

19. The composition of claim 17 wherein said polycarboxylic acid resin is extended by blending it with a minor proportion of a non-heat reactive phenol-aldehyde resin at a temperature between about 200° and 260° C. for at least about 30 minutes.

20. The composition of claim 15 wherein said polycarboxylic acid resin comprises an alkyd resin.

21. The composition of claim 15 wherein said polycarboxylic acid resin has carboxyl groups contributed by an alpha, beta unsaturated carboxylic acid.

22. The composition of claim 15 wherein at least a portion of said amino compound is replaced by ammonia.

23. A process for electrocoating an anode with paint in an electrical circuit comprising a bath of aqueous medium in electrical contact with an anode and a cathode which comprises: dispersing in said bath a paint having as its essential binder a film-forming synthetic polycarboxylic acid resin at least partially neutralized in said bath with a sufficient quantity of water soluble amino compound to maintain said polycarboxylic acid resin as a dispersion of anionic polyelectrolyte in said bath at a bath pH not substantially above about 8.3, said acid resin being selected from the group consisting of a coupled glyceride drying oil reacted under substantially anhydrous conditions with about 2–25% by weight of a polymerizable vinyl monomer, an alkyd resin having acid number of about 60–200, a polycarboxylic acid resin having carboxyl groups contributed by an alpha, beta unsaturated carboxylic acid, and mixtures of same, said acid resin having electrical equivalent weight between about 1,000 and about 20,000, acid number between about 30 and about 300, and exhibiting anionic polyelectrolyte behavior as indicated by its depositing on said anode substantially directly proportional to direct electric current passed through said bath; passing direct electric current through said circuit at a potential of about 50–500 volts, thereby causing a paint film of substantially uniform thickness to electrodeposit and coalesce on said anode; withdrawing the resulting coated anode from said bath; and thereafter curing said film.

24. The process of claim 23 wherein said polycarboxylic acid resin is extended with a minor proportion of a phenol-aldehyde resin.

25. The process of claim 23 wherein said acid resin is extended with a minor proportion of a hydrocarbon resin.

26. The process of claim 23 wherein said acid resin is a coupled glyceride drying oil reacted under substantially anhydrous conditions with about 2–25% of a polymerizable vinyl monomer.

27. The process of claim 23 wherein said acid resin is an alkyd resin having acid number of about 60–200.

28. The process of claim 23 wherein said acid resin has carboxyl groups contributed by an alpha, beta unsaturated carboxylic acid.

29. The process of claim 1 wherein at least a portion of said water soluble amino compound is a polyamine.

30. The process of claim 1 wherein at least a portion of said water soluble amino compound is an hydroxy amine.

31. The process of claim 1 wherein at least a portion of said water soluble amino compound is a monoamine.

32. The process of claim 1 wherein at least a portion of said water soluble amino compound is replaced by ammonia.

33. The process of claim 1 wherein said polycarboxylic acid resin has an electrical equivalent weight between about 1,000 and about 2,000.

34. A bath composition for electrocoating an anode with paint, said bath composition consisting essentially of an aqueous dispersion of paint containing as the predominant fraction of its film-forming paint binder resin a synthetic carboxylic acid resin having electrical equivalent weight between about 1,000 and about 20,000 and acid number between about 30 and about 300, said polycarboxylic acid resin being neutralized in said aqueous dispersion with a sufficient quantity of water soluble amino compound to maintain said polycarboxylic acid resin as anionic polyelectrolyte at a pH below about 8.4, the concentration of said polycarboxylic acid resin in said aqueous dispersion being between about 0.5% and about 40% by weight.

35. The bath composition of claim 34 wherein the electrical equivalent weight of said polycarboxylic acid resin is between about 1,000 and about 2,000.

36. The bath composition of claim 34 wherein the bath pH is between about 5 and about 8.3.

37. The bath composition of claim 34 wherein said polycarboxylic acid resin has acid number above about 100 and the bath pH is between about 5 and about 8.3.

38. The bath composition of claim 34 wherein said polycarboxylic acid resin has acid number below about 100, and the bath pH is between about 7 and about 8.3.

39. The bath composition of claim 34 wherein the concentration of said binder resin is between about 2.5% and about 35% by weight.

40. The bath composition of claim 34 wherein said acid resin comprises a siccative oil-modified polycarboxylic acid resin.

41. The bath composition of claim 40 wherein said polycarboxylic acid resin comprises a coupled glyceride drying oil reacted under substantially anhydrous conditions with about 2–25% of a polymerizable vinyl monomer.

42. The bath composition of claim 41 wherein said polycarboxylic acid resin is extended with a non-heat reactive phenol-aldehyde resin.

43. The bath composition of claim 34 wherein said polycarboxylic acid resin comprises an alkyd resin.

44. The bath composition of claim 34 wherein said polycarboxylic acid resin has carboxyl groups contributed by an alpha, beta, unsaturated carboxylic acid.

45. The bath composition of claim 34 which contains about 0.1–10%, basis weight of said polycarboxylic acid resin in the bath, of a nonionic organic liquid solubilizing assistant for said resin, the proportion of said nonionic liquid being insufficient to form a distinct phase.

46. The bath composition of claim 34 where there are an excess of amino groups in solution over those required to maintain said polycarboxylic acid resin as a dispersion of anionic polyelectrolyte.

47. The bath composition of claim 46 wherein there is added sufficient polybasic carboxylic acid of molecular weight below about 1,000 for neutralizing at least a portion of said excess of amino groups.

48. The bath composition of claim 47 wherein said polybasic carboxylic acid of molecular weight below about 1,000 is a polymer of a polyenoic acid having 12–44 carbon atoms.

49. The bath composition of claim 34 wherein at least a portion of said water soluble amino compound is a polyamine.

50. The bath composition of claim 34 wherein at least a portion of said water soluble amino compound is an hydroxy amine.

51. The bath composition of claim 34 wherein at least a portion of said water soluble amino compound is a monoamine.

52. The composition of claim 34 wherein at least a portion of said amino compound is replaced by ammonia.

53. In a process for electrocoating an anode with an organic coating material in an electrical circuit comprising a bath of aqueous medium in electrical contact with an anode and a cathode, the improvement which comprises: dispersing in said bath a synthetic polycarboxylic acid resin at least partially neutralized with a sufficient quantity of water soluble amino compound to maintain said acid resin as a dispersion in said bath, passing direct electric current through said circuit at a potential that is sufficient to cause a film of said resin to electrodeposit from said bath on said anode and is not above about 500 volts, and withdrawing the resulting coated anode from said bath, said acid resin having electrical equivalent weight between about 1,000 and about 20,000, an acid number between about 30 and about 300 and depositing on said anode substantially directly proportional to said electric current.

References Cited by the Examiner

UNITED STATES PATENTS

| | | | |
|---|---|---|---|
| 1,998,744 | 4/1935 | Ubben | 260—75 |
| 2,068,424 | 1/1937 | Mack | 204—181 |
| 2,215,144 | 9/1940 | Clayton | 204—181 |
| 2,337,972 | 12/1943 | Clayton | 204—181 |
| 2,439,425 | 4/1948 | Gresham | 204—72 |
| 2,530,366 | 11/1950 | Gray | 204—181 |
| 2,634,245 | 4/1953 | Ardnt | 260—22 |
| 2,680,713 | 6/1954 | Linchsey | 204—14.1 |
| 2,926,154 | 2/1960 | Klim | 260—29.2 |
| 2,961,384 | 11/1960 | Scroggs | 204—59 |
| 3,067,158 | 12/1962 | Bolton | 260—29.2 |
| 3,070,256 | 12/1962 | Bremmer | 260—75 |

FOREIGN PATENTS

| | | |
|---|---|---|
| 10,922 | 12/1927 | Australia. |
| 101,919 | 8/1937 | Australia. |
| 516,490 | 1/1940 | Great Britain. |
| 739,722 | 11/1955 | Great Britain. |

OTHER REFERENCES

Glasstone: "The Mechanism of the Kolbe Electrosynthesis and Allied Reactions." The Electrochemical Society Preprint 75–14, May 1, 1939.

JOHN H. MACK, *Primary Examiner.*

MURRAY TILLMAN, WINSTON A. DOUGLAS,
*Examiners.*